(12) United States Patent
Hunzinger

(10) Patent No.: US 7,149,201 B2
(45) Date of Patent: Dec. 12, 2006

(54) ENHANCED BEARER OVERHEAD MONITORING FOR IMPROVED POSITION LOCATION PERFORMANCE FOR WIRELESS MOBILES

(75) Inventor: Jason F. Hunzinger, Carlsbad, CA (US)

(73) Assignee: DENSO Corporation, Kariya (JP)

( * ) Notice: Subject to any disclaimer, the term of this patent is extended or adjusted under 35 U.S.C. 154(b) by 850 days.

(21) Appl. No.: 10/029,578

(22) Filed: Dec. 20, 2001

(65) Prior Publication Data

US 2002/0077124 A1 Jun. 20, 2002

Related U.S. Application Data

(60) Provisional application No. 60/257,208, filed on Dec. 20, 2000.

(51) Int. Cl.
*H04B 7/216* (2006.01)
*H04B 7/00* (2006.01)
*H04Q 7/00* (2006.01)
*H04Q 7/20* (2006.01)
*G08C 17/00* (2006.01)

(52) U.S. Cl. ............ 370/335; 370/342; 370/331; 370/311; 455/436; 455/456.1; 455/515

(58) Field of Classification Search ............ 455/456, 455/457, 422, 423, 432–439, 442, 443; 370/335, 370/336, 329, 331, 332, 342, 350, 441
See application file for complete search history.

(56) References Cited

U.S. PATENT DOCUMENTS

| | | | | |
|---|---|---|---|---|
| 5,361,396 A | * | 11/1994 | Onoe et al. ............ | 455/435.1 |
| 5,920,549 A | * | 7/1999 | Bruckert et al. ............ | 370/331 |
| 6,069,880 A | * | 5/2000 | Owen et al. ............ | 370/311 |
| 6,101,173 A | * | 8/2000 | Bayley ............ | 370/311 |
| 6,256,494 B1 | * | 7/2001 | Lopes et al. ............ | 455/423 |
| 2002/0142776 A1 | * | 10/2002 | Tiedemann, Jr. ............ | 455/450 |
| 2003/0174760 A1 | * | 9/2003 | Rick et al. ............ | 375/147 |

* cited by examiner

*Primary Examiner*—Steven Nguyen
(74) *Attorney, Agent, or Firm*—Harness, Dickey & Pierce, PLC

(57) ABSTRACT

A mobile station monitors common channels for information that can be used to associate a location to an infrastructure element identification. The mobile station stores such information in a database. The database can be accessed at a later time to estimate the location of the mobile station based on comparing previous location/infrastructure element ID pairs to the pairs collected at the later time.

18 Claims, 5 Drawing Sheets

ENHANCED BEARER OVERHEAD MONITORING FOR IMPROVED POSITION LOCATION PERFORMANCE FOR WIRELESS MOBILES

CROSS-REFERENCE TO RELATED APPLICATIONS

This application claims benefit of U.S. Provisional application No. 60/257,208, filed Dec. 20, 2000, the content of which is herein incorporated by reference in its entirety.

TECHNICAL FIELD

This invention relates to wireless communication systems, and more particularly to providing a system that allows wireless communication system mobile terminals to more accurately or precisely perform position location through a process of enhanced monitoring of information transmitted on a wireless service bearer.

BACKGROUND

Wireless communication systems may operate using fixed infrastructure equipment or in ad-hoc configurations. In fixed infrastructure models, wireless communication systems typically comprise a plurality of base stations and mobile stations that communicate using an over-the-air communication protocol using physical layer technologies such as Code Division Multiple Access (CDMA) technology. IS-95, Mobile Station-Base Station Compatibility Standard for Dual-Mode Wideband Spread Spectrum Cellular System, published in July 1993 is an example of such a protocol standard. CDMA uses digital spread spectrum techniques that are less susceptible to interference.

Wireless communications systems such as CDMA typically operate using a variety of channels. In CDMA, for example, channelization is accomplished using orthogonal or quasi-orthogonal codes. Different channels generally have different purposes. Common channels are used to communicate to a plurality of mobile stations or base stations at the same time while dedicated channels are typically used for communication to and from one mobile station.

Wireless communication systems are beginning to incorporate network-based and network-assisted location determination systems. Some wireless handsets have network assisted GPS capability. Some CDMA wireless handsets make use of the wireless communication signals themselves to perform location-related measurements such as in Enhanced Forward Link Trilateration (EFLT) or Advanced Forward Link Trilateration (AFLT) methods that use the difference in phase delays of wireless signals as input to location calculations. Other wireless communication systems, such as some telematics products incorporate stand-alone capabilities such as GPS. Wireless terminals without location capabilities may also have access to location related information. For example, the base station that a mobile station communicates with may have a unique identifier that identifies that particular base station to the mobile or signal conditions may be recognized from past observations. These types of information inherently identify the mobile station's general location as being the same as at some prior time.

Location information can be used to enable location-based services. Similarly, location-based services can be network or terminal based or distributed between wireless communication system entities. Distributed or network based services generally require active communication and use of wireless resources such as communication channels. For example, the TIA/EIA location protocol standard IS-801 enables network-assisted GPS via messaging over the CDMA wireless link between infrastructure and terminals. Such resources may be expensive, limited and have quality of service impacts on usage such as moderate or high latency.

Networks typically transmit location-related information or identification information to mobile stations. However, such information is typically limited to idle state while channels used for connections do not typically transport as much location or identification related information. For example, IS-95A systems typically broadcast base station identification and base station latitude and longitude information on common channels that mobile stations monitor in idle state. These systems typically do not transmit such information on dedicated traffic channels. Additionally, mobile stations typically monitor only one sector at a time during idle. This limits the amount of information that a mobile station can observe. Therefore, according to existing standards and implementations, mobile stations do not have adequate access to location-related information.

What is needed is a method of obtaining and using location-related information associated with wireless communication infrastructure.

SUMMARY

The present invention provides a system for obtaining and using location-related information associated with wireless communication infrastructure. A mobile station can monitor common channels (including but not limited to paging channels, control channels and the like) for information that can be used to associate a location (e.g. latitude and longitude) to an infrastructure element identification. The mobile station can store such information in a database. The database can be accessed at a later time to estimate the location of the mobile station based on comparing previous location/infrastructure element ID pairs to the pairs collected at the later time.

These and other features and advantages of the invention will become more apparent upon reading the following detailed description and upon reference to the accompanying drawings.

DETAILED DESCRIPTION

Figure 1:
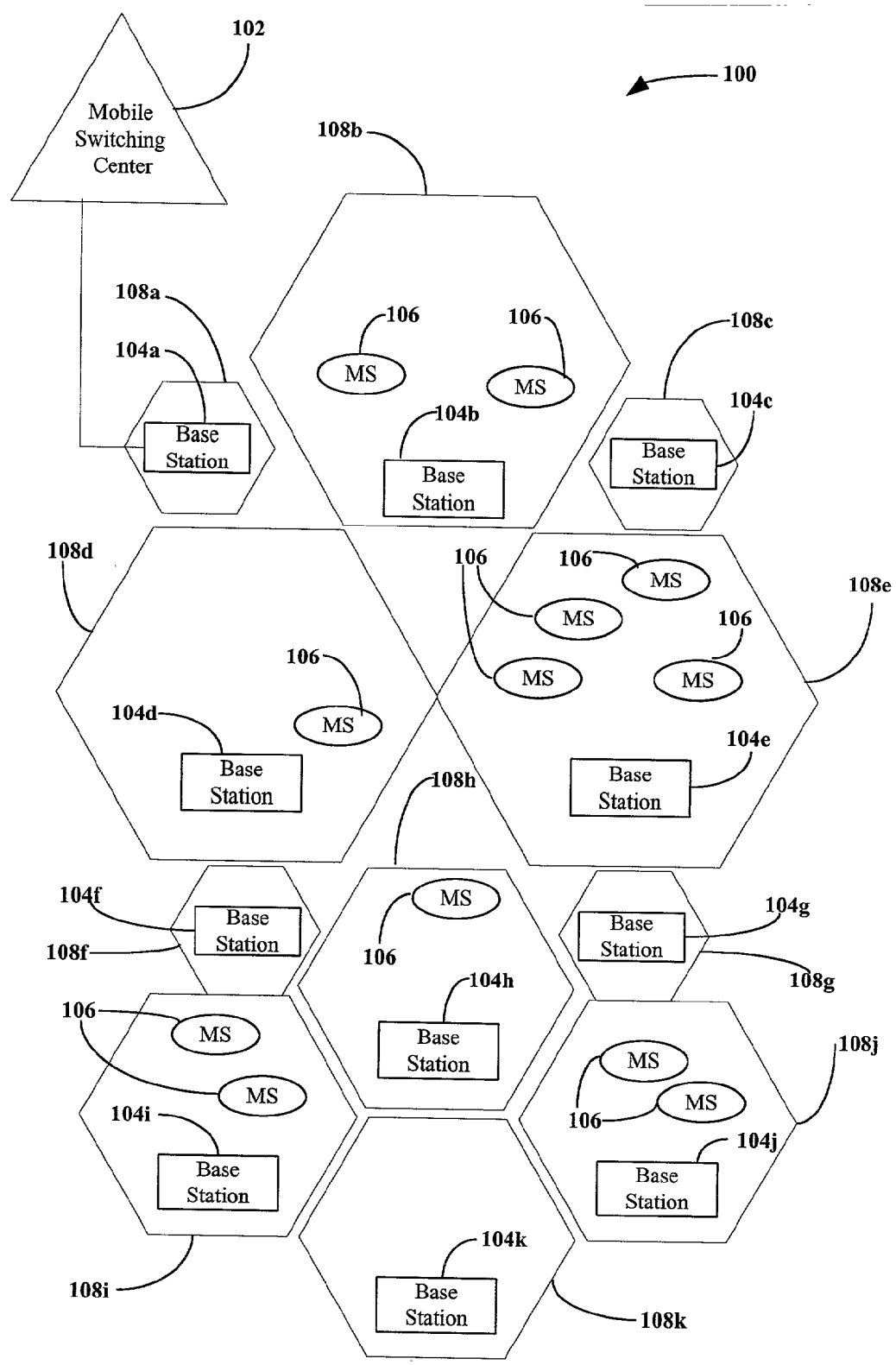
FIG. 1 illustrates components of a wireless communication system appropriate for use with an embodiment of the invention.

FIG. 1 illustrates components of an exemplary wireless communication system. A mobile switching center 102 communicates with base stations 104a–104k (only one connection shown). The base stations 104a–104k (generally 104) broadcasts data to and receives data from mobile stations 106 within cells 108a–108k (generally 108). The cell 108 is a geographic region, roughly hexagonal, having a radius of up to 35 kilometers or possibly more.

A mobile station 106 is capable of receiving data from and transmitting data to a base station 104. In one embodiment, the mobile station 106 receives and transmits data according to the Code Division Multiple Access (CDMA) standard. CDMA is a communication standard permitting mobile users of wireless communication devices to exchange data over a telephone system wherein radio signals carry data to and from the wireless devices.

Under the CDMA standard, additional cells 108a, 108c, 108d, and 108e adjacent to the cell 108b permit mobile stations 106 to cross cell boundaries without interrupting communications. This is so because base stations 104a, 104c, 104d, and 104e in adjacent cells assume the task of transmitting and receiving data for the mobile stations 106. The mobile switching center 102 coordinates all communication to and from mobile stations 106 in a multi-cell region. Thus, the mobile switching center 102 may communicate with many base stations 104.

Mobile stations 106 may move about freely within the cell 108 while communicating either voice or data. Mobile stations 106 not in active communication with other telephone system users may, nevertheless, scan base station 104 transmissions in the cell 108 to detect any telephone calls or paging messages directed to the mobile station 106.

One example of such a mobile station 106 is a cellular telephone used by a pedestrian who, expecting a telephone call, powers on the cellular telephone while walking in the cell 108. The cellular telephone scans certain frequencies (frequencies known to be used by CDMA) to synchronize communication with the base station 104. The cellular telephone then registers with the mobile switching center 102 to make itself known as an active user within the CDMA network.

When detecting a call, the cellular telephone scans data frames broadcast by the base station 104 to detect any telephone calls or paging messages directed to the cellular telephone. In this call detection mode, the cellular telephone receives, stores and examines paging message data, and determines whether the data contains a mobile station identifier matching an identifier of the cellular telephone. If a match is detected, the cellular telephone establishes a call with the mobile switching center 102 via the base station 104. If no match is detected, the cellular telephone enters an idle state for a predetermined period of time, then exits the idle state to receive another transmission of paging message data.

Figure 2:
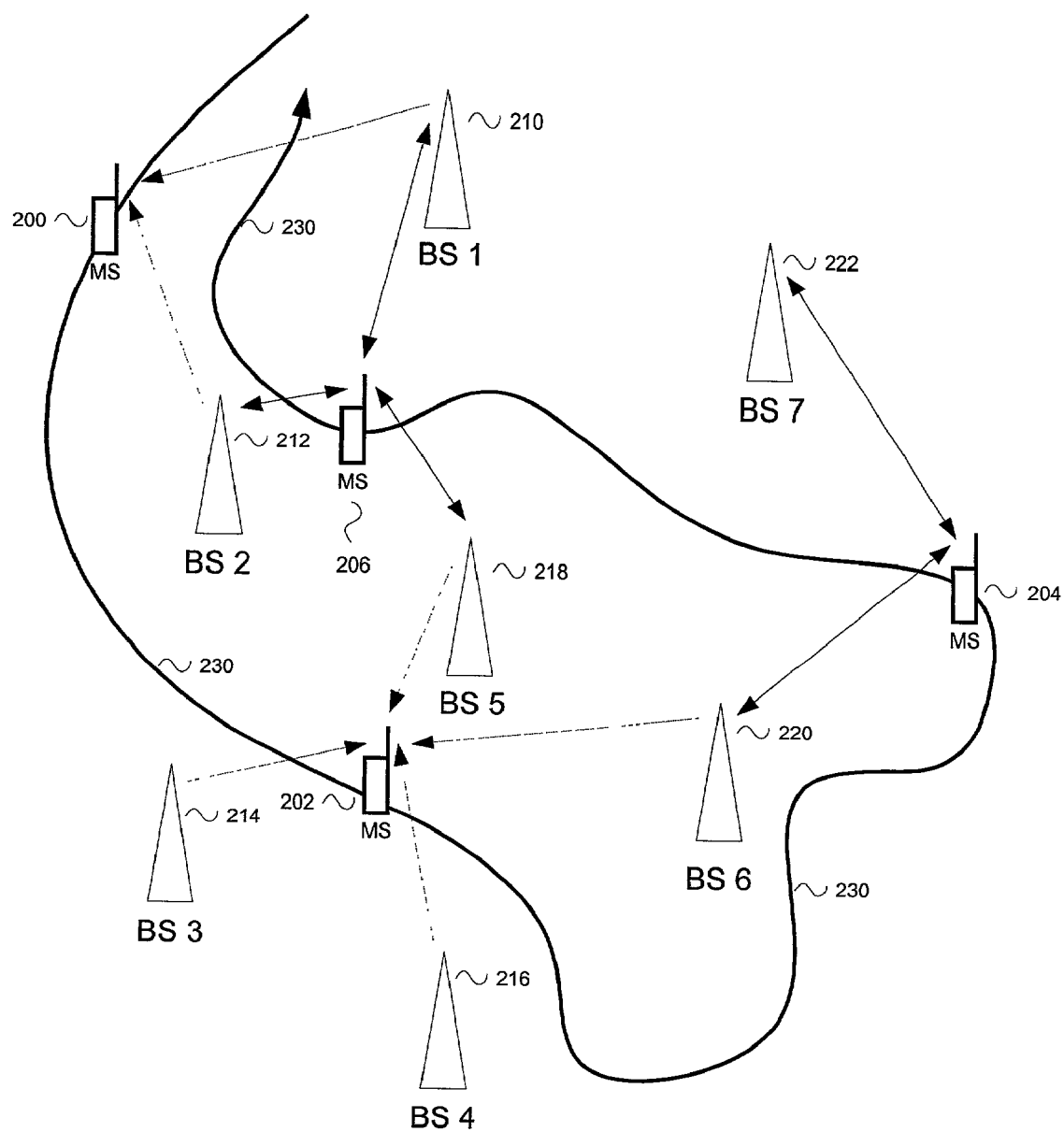
FIG. 2 is a diagram of a roaming mobile station in a wireless communication network.

FIG. 2 is a diagram of a roaming mobile station in a wireless communication network. The roaming mobile station is capable of monitoring common control or overhead channels transmitted by base stations or receive a plurality of forward traffic or control bearing channels. In the example shown in FIG. 2, the mobile station moves along a path 230 through the wireless network that comprises a plurality of base stations of which 7 are shown. FIG. 2 is an example of a user carrying a cdma2000 mobile station while walking or driving. In the course of this motion the mobile station monitors the channel(s) of a number of sectors performing hand-offs as needed to maintain communication while idle. The mobile station roams from point 200 to point 202 collecting overhead information from base stations 1 through 6. At point 204, the mobile station enters a connection state with base station 7 222 and proceeds into soft-handoff with base station 6 220. For purposes of explanation, the sectors or base stations that the mobile is using for communication purposes will be denoted as "primary". For example, at point 206, the mobile station is in active communication with base station 1 210, base station 2 212, and base station 5 218. Note that in idle, the mobile station may only have one primary sector at any given point in time. For example, at point 200, the mobile station may be able to receive signals from both base station 1 210 and base station 2 212 but, according to standards, monitors only one for pages and overhead parameters. Typically the choice is up to the mobile and is generally implemented to give preference to the sector with the strongest pilot signal. In wireless standards, that sector is typically called the active sector and the others are, for example, called neighbors or remaining pilots. Handoffs are required for the wireless system to function or to comply with the standard. However, in the present invention the mobile station additionally monitors the non-pilot channels of sectors other than the active sector(s) and collects location-related information about those sectors. These other sectors will be referred to as "secondary".

One embodiment of this invention is a mobile station that monitors overhead channels or parameter bearing channels from secondary sectors in addition to those from the active serving sector. For example, in FIG. 2, if the mobile station at location 202 observes base station 5 as having the strongest pilot signal, then the mobile station monitors that base station's paging channel for messages directed to it and also monitors the paging channels of base stations 3, 4 and 6 for location-related information. The timing and management of such monitoring processes is described below.

In the present invention, the mobile station collects location-related information from base stations for current or future position-determination needs or other location-based operations. Overhead information is typically broadcast on a common channel that is receivable by a plurality of mobile stations. Some examples of overhead information that is transmitted by base-stations and that is applicable to location are base station latitude-longitude pairs, base station identification numbers or codes, and pilot pseudo-noise (PN) offsets. PN offsets and other identification information such as base station identification numbers are used for cross-reference purposes. Any information that can be used directly or indirectly to identify or narrow down the choice of base stations or sectors or be used in the process of position location can be monitored and collected.

In one embodiment of the present invention the mobile station maintains a cache or database of base station or sector information. The stored information can be used when a location-fix (or other location information or function) is required. It may store some or all of this information in non-volatile memory and re-use it at a much later date because locations of base stations do not regularly change. The present invention could also be used in a case where the network nodes are dynamic (for example in an ad hoc network) but the rate of updating the cache or database would typically have to be faster.

When a position-fix is required, the mobile station may use the stored information as well as, for example, current signal or timing measurements, to compute the solution or send the information to another entity to perform the computation. The sector information may be used to identify the base station locations or to perform a differential positioning function.

Figure 3:
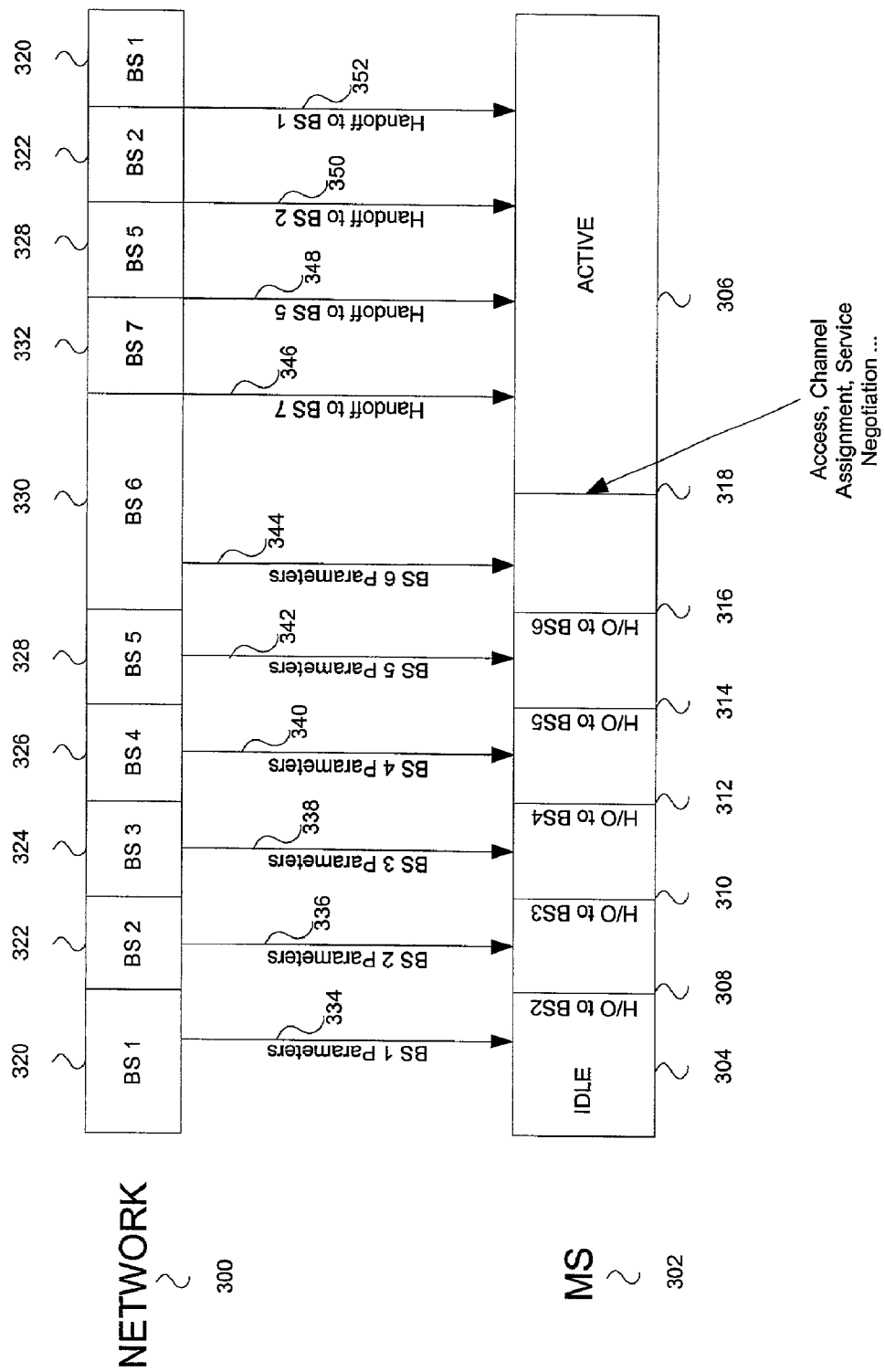
FIG. 3 is a time-line diagram showing communications between a mobile station and the wireless communications network while in idle and while in active state.

FIG. 3 is a time-line diagram showing communications between a mobile station 302 and the wireless communications network 300 while idle 304 and in active state 306. This timing diagram is not meant to be to scale but rather to show the general sequence of operations. The mobile station 302 typically monitors the paging channel of the primary sector. Mobile stations control timing and direction of idle handoffs according to their measurements of pilot signals and paging channel frames. The network does not, in general, have control over handoffs in idle state.

Consider the case where the mobile station selects to monitor base station 1 320 as it has the strongest pilot signal. The mobile station may, therefore, receive and collect base station 1 parameter information 334. In the present invention, the mobile station may handoff to other sectors to monitor and collect overhead information. For example, the mobile station may handoff to base station 2 308 to receive base station 2 parameters 336. The mobile station may proceed to do this repeatedly to collect information from a plurality of base stations.

If and when the mobile station enters the active state 306 through a process of access probing, channel assignment and subsequent service negotiation 318, then the mobile station monitors the traffic channel(s). For example, the mobile station commences active state by receiving from and transmitting to base station 6 330. During the process of maintaining a call, the mobile station may be directed by base stations to handoff to additional base stations according to, for example, resources or signal strength measurements transmitted by the mobile station to the network. For example, base station 6 330 instructs the mobile station to handoff to base station 7 332 in a handoff message 346.

Figure 4:
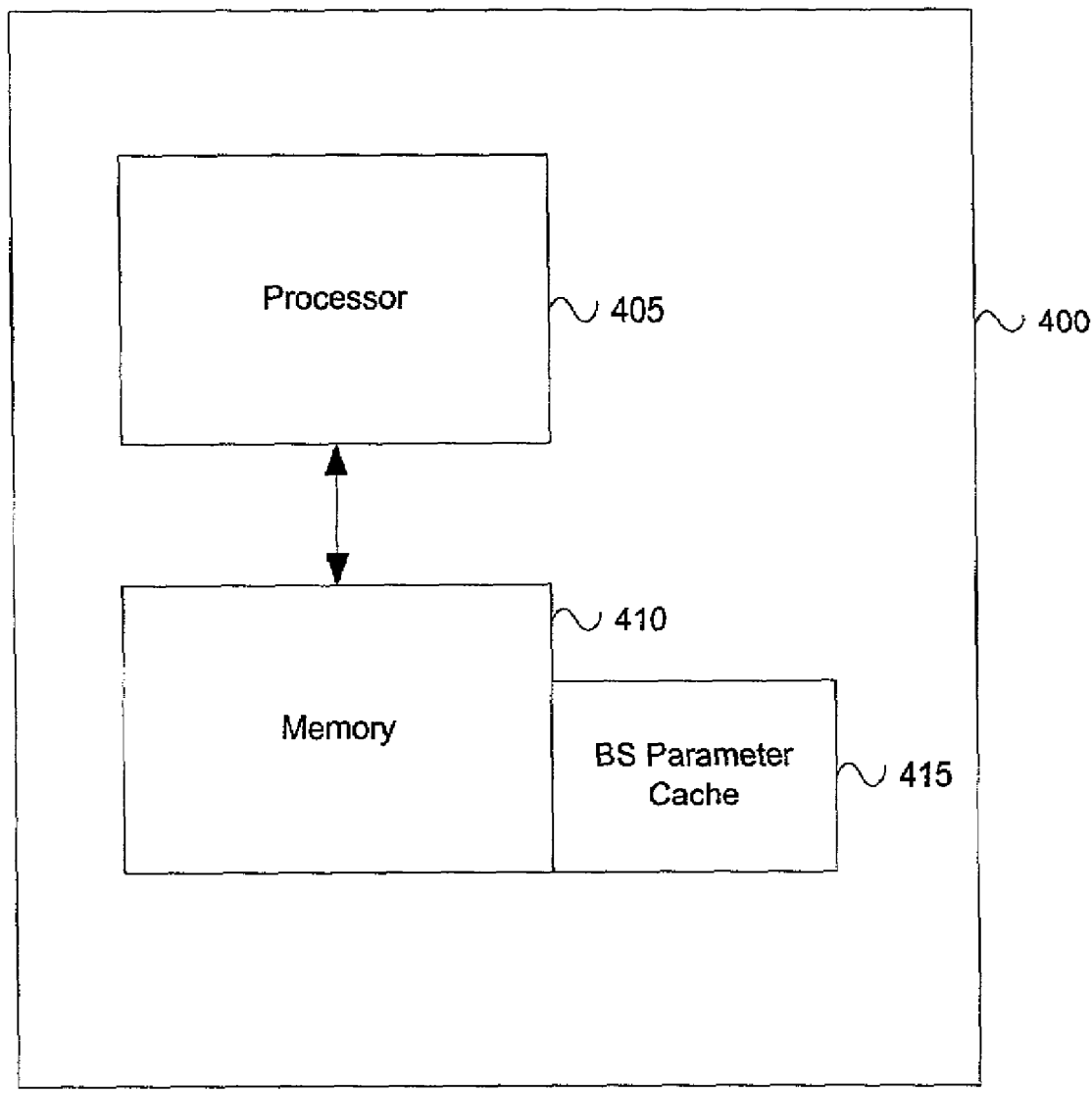
FIG. 4 is a diagram of a mobile station comprising a processor and memory with a memory portion used for storing a cache of location-related base station parameter information.

FIG. 4 is a diagram of a mobile station 400 comprising a processor 405, memory 410 and a memory portion 415 used for storing a cache of location-related base station parameter information.

Figure 5:
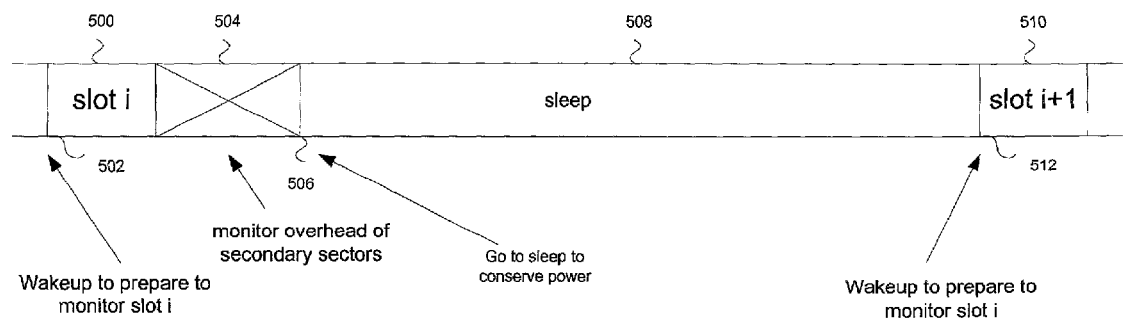
FIG. 5 is a timing diagram of a mobile station in idle mode following an exemplary process of enhanced bearer overhead monitoring.

FIG. 5 is a timing diagram of a mobile station in idle mode following an exemplary process of enhanced bearer overhead monitoring. Mobile stations typically operate in a standby mode that allows them to save power. 2G and 3G CDMA standards such as IS-95A and IS-2000A specify a slotted mode operation whereby mobile stations must monitor specific slots for directed messages but are not required to monitor the common control channel (broadcast, paging or other such forward common channel) of the active sector in between those slots. This allows the mobile to save power and extend battery life by sleeping during non-assigned slot periods 508 such as that shown in FIG. 5. The present invention makes use of the time that a mobile station need not monitor the channel. Instead of sleeping the entire time between slots, the mobile station may tune to a secondary channel and/or monitor a secondary base-station's common control channel, paging channel or broadcast channel to collect location-related information. In FIG. 5, this operation is shown occurring directly after monitoring the slot. For example, the mobile station wakes up from sleep 502, and monitors its assigned slot (i) 500 and, after completing this monitoring of the primary sector, the mobile station monitors additional sectors for a period of time 504 before going to sleep 506. The mobile station then remains asleep 508 until it wakes up 512 for the next slot (i+1) 510. This operation may be repeated.

The present invention involves monitoring the channels of one or more sectors other than the channels used by the mobile for wireless operation. In other words, while the standard may require that the mobile station monitor certain channels or "active" base stations (or the selection of base stations to communicate with or monitor transmissions from), this invention includes a means to monitor other secondary channels (potentially on other frequencies) while complying with the standards procedures. In the case of $2^{nd}$ and $3^{rd}$ generation CDMA or 1×EV-DO or derivative standards, the mobile station may suspend or disable the forward fade timer that might otherwise cause the mobile station to return to system determination. The reason for this is that, in general, the mobile station may want to monitor one or more secondary base stations that it can barely receive a signal from. This can still be useful because all that may be needed is some of the location-related information. It is not necessary to maintain reliable or usable communications with secondary sectors.

There are several possibilities in terms of when, during the time that the mobile is not monitoring its assigned slot(s), that the mobile may monitor other sectors. FIG. 5 shows the case where the mobile station monitors secondary sectors immediately after the assigned slots. Monitoring of secondary sectors may also be performed at some point during the period that the mobile station would otherwise be sleeping. Monitoring of the secondary sectors may be done periodically every pre-determined number of slots, for example. Or, the mobile station could monitor a subset of secondary sectors each slot.

The mobile station may alternatively monitor the secondary sectors just before its assigned slot. The mobile may search for pilot channels while monitoring the secondary sector(s) and thereby be well prepared to receive potential messages in the upcoming slot. Additionally the mobile station would then be ready to handoff to an alternative sector if the currently active sector fails to be acceptable for reception or a handoff is required according to the standard that the mobile adheres to. This pre-slot monitoring serves two purposes: first, to collect information on non-serving sectors and second, to have a backup option for graceful wakeup.

A potential complication with pre-slot monitoring of another sector is that the mobile station may not know how long it will have to monitor that secondary sector in order to collect the required information (due to the scheduling of the applicable messaging or lost messages due to degraded link quality). The alternative, where the mobile station monitors secondary sectors after the assigned slot, overcomes this problem. In one embodiment, the mobile station may spread out the monitoring over as large a number of slots as possible rather than, for example, monitor all secondary sectors for a large period of time before every $N^{th}$ slot (where N is a predetermined, programmable or adaptable parameter). If the latter were implemented, only every $N^{th}$ slot would benefit from the more robust wakeup process. These two issues may appear to be tradeoffs. However, this can be partially overcome by monitoring fewer sectors per pre-slot period. For example, the mobile station could monitor only one secondary sector before it monitors the active sector in use for the assigned slot. A conservative amount of time can be allocated for this purpose by waking up sufficiently earlier than the next assigned slot. If, in the pre-slot period, the mobile completes monitoring the secondary sector, it may monitor another, or several others before the slot time arrives when it must monitor for a page. The mobile station may cycle through sectors to accomplish this function or may prioritize sectors according to the completeness or freshness of current data from that sector.

Another element of the present invention is that the mobile station may selectively only scan secondary sectors that are newly noticed (according to the neighbor, candidate, or remaining set maintenance or other means such as signaling) or are deteriorating and are likely to be not receivable in the near future. Another element of the present invention includes only monitoring sectors whose pilots cross some threshold. The mobile may also "peak" at messages rather than monitoring the secondary sectors for long periods of time. The mobile can receive part of a message and determine if the type is not relevant and if the length is so long that, instead of waiting for the next message, it can spend the time more productively on another sector or channel. This is possible for messages that have a length or type at the front as is typical in CDMA and other wireless technologies.

In traffic mode, a mobile station may collect base station overhead information. In this mode it is not always possible to leave the traffic channels to monitor other paging channels. For example, when a high quality voice call is active. However, if a break is tolerable, or possible without data loss (for example when no data is being sent during a circuit switched or packet switched data connection), then the mobile can use this technique. In general, it is preferable to already have the necessary information collected and stored. Thus an aggressive standby data collection is advisable. Whenever the mobile receives indication of new or unknown neighbors, in idle, then it should schedule such data collection through enhanced bearer overhead monitoring.

Although the terms common channel, paging channel and broadcast channel were used in describing the location or identification bearing forward communications, the invention is equally applicable to other well-known channels of similar types. Also, although CDMA was used as an example of wireless technology, the invention applies equally to other telecommunications technologies. Note that channels can be identified not only by codes as in CDMA but also be time slots or frequencies.

Although the present invention has been fully described in connection with the preferred embodiments thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. A method of enhanced common channel monitoring in a wireless communication system comprising:
   receiving data from common channels during an idle state to obtain location information linked to infrastructure element identification;
   storing said location information in a database;
   accessing said database to determine location information related to non serving base stations; and
   accessing said database during an active state to determine the location information related to serving base stations that is not sent during the active state.

2. The method of claim 1, further comprising receiving data from a common channel from a serving base station during an active state.

3. The method of claim 1, further comprising receiving data from the common channels for a pre-determined period of time prior to an assigned slot.

4. The method of claim 1, further comprising receiving data from the common channels after an assigned slot.

5. The method of claim 1, further comprising receiving data from new common channels only during the idle state.

6. A method of monitoring overhead information from non-serving sectors comprising:
   waking up a designated period of time earlier than an assigned slot to monitor a common channel transmitted by a non-server sector to obtain location information;
   monitoring additional common channels transmitted by other non-serving sectors as time permits before the next assigned; and
   applying the location information obtained during said non-serving sector monitoring for common channel re-acquisition when acquisition of the serving sector fails during slotted-mode operation.

7. The method of claim 6, further comprising storing the location information obtained from the common channels in a database.

8. The method of claim 7, further comprising accessing the database to determine location information of the non-serving sectors.

9. A wireless communication system comprising:
   a serving base station and one or more non serving base stations which transmit common channels containing location information linked to an infrastructure element identification; and
   one or more mobile stations which receive data from the common channels during an idle state to obtain the location information linked to an infrastructure element identification, wherein the one or more mobile stations store the location information linked to an infrastructure element identification in a database and access the database to determine location information related to one of the one or more non serving base stations; wherein
   the one or more mobile stations accesses the database during an active state to determine location information related to the serving base station that is not sent during the active state.

10. The wireless communication system of claim 9, wherein the one or more mobile stations receive data from a common channel from the serving base station during an active state.

11. The wireless communication system of claim 9, wherein the one or more mobile stations receive data from the common channels for a pre-determined period of time prior to an assigned slot.

12. The wireless communication system of claim 9, wherein the one or more mobile stations receive data from the common channels after an assigned slot.

13. The wireless communication system of claim 9, wherein the one or more mobile stations receive data from new common channels only during the idle state.

14. A mobile station for obtaining location information in a network, the network containing a serving base station and one or more non-serving base stations which transmit common channels containing location information linked to an infrastructure element identification, the mobile station comprising:
   a database; and
   a mobile station processor programmed for receiving data from the common channels during an idle state to obtain the location information linked to an infrastructure element identification, and storing the location information linked to an infrastructure element identification in the database and accessing the database to determine location information related to one of the one or more non-serving base stations; wherein the mobile station processor is further programmed for accessing the database during an active state to determine location information related to the serving base station that is not sent during the active state.

15. The mobile station of claim 14, wherein the mobile station processor is further programmed for receiving data from a common channel from the serving base station during an active state.

16. The mobile station of claim 14, wherein the mobile station processor is further programmed for receiving data from the common channels for a pre-determined period of time prior to an assigned slot.

17. The mobile station of claim 14, wherein the mobile station processor is further programmed for receiving data from the common channels after an assigned slot.

18. The mobile station of claim 14, wherein the mobile station processor is further programmed for receiving data from new common channels only during the idle state.

* * * * *